United States Patent
Segawa et al.

(10) Patent No.: US 11,686,244 B2
(45) Date of Patent: Jun. 27, 2023

(54) VARIABLE-CAPACITY TURBOCHARGER

(71) Applicant: IHI Corporation, Tokyo (JP)

(72) Inventors: Kenichi Segawa, Tokyo (JP); Kouichi Handa, Tokyo (JP); Ryota Sakisaka, Tokyo (JP)

(*) Notice: Subject to any disclaimer, the term of this patent is extended or adjusted under 35 U.S.C. 154(b) by 122 days.

(21) Appl. No.: 17/486,920

(22) Filed: Sep. 28, 2021

(65) Prior Publication Data
US 2022/0010722 A1    Jan. 13, 2022

Related U.S. Application Data

(63) Continuation of application No. PCT/JP2019/041573, filed on Oct. 23, 2019.

(30) Foreign Application Priority Data

Apr. 1, 2019   (JP) .................................. 2019-070097

(51) Int. Cl.
*F02B 37/24*   (2006.01)
*F02B 37/22*   (2006.01)
(Continued)

(52) U.S. Cl.
CPC .............. *F02B 37/24* (2013.01); *F02B 37/22* (2013.01); *F02C 6/12* (2013.01); *F01D 17/165* (2013.01);
(Continued)

(58) Field of Classification Search
CPC .. F02B 37/24; F02B 37/22; F02C 6/12; F01D 17/165; F01D 25/24; F01D 17/16;
(Continued)

(56) References Cited

U.S. PATENT DOCUMENTS

2005/0260067 A1* 11/2005 Parker .................. F01D 17/165
                                                                            415/160
2014/0147278 A1   5/2014 Demolis et al.
(Continued)

FOREIGN PATENT DOCUMENTS

JP   S60-012630   1/1985
JP   S61-037404   3/1986
(Continued)

OTHER PUBLICATIONS

International Search Report dated Dec. 17, 2019 for PCT/JP2019/041573.
(Continued)

*Primary Examiner* — Mickey H France
*Assistant Examiner* — Edward Bushard
(74) *Attorney, Agent, or Firm* — Soei Patent & Law Firm

(57) ABSTRACT

A variable-capacity turbocharger includes a nozzle flow passage in which a gas is capable of flowing therethrough from a scroll flow passage toward a turbine impeller, a connecting pin connecting flow passage wall surfaces forming the nozzle flow passage, and nozzle vanes arranged in a rotation direction of the turbine impeller. At least one of the flow passage wall surfaces includes an inner peripheral side wall surface extending radially inward of a first reference line extending in the rotation direction, an outer peripheral side wall surface which is a plane extending radially outward from a second reference line extending in the rotation direction and parallel to a plane orthogonal to rotation axes of the nozzle vanes, and an intermediate wall surface which is a plane extending from the first reference line to the second reference line and parallel to the plane extending orthogonal to the rotation axes of the nozzle vanes.

20 Claims, 5 Drawing Sheets

(51) Int. Cl.
*F02C 6/12* (2006.01)
*F01D 17/16* (2006.01)

(52) U.S. Cl.
CPC .... *F05D 2220/40* (2013.01); *F05D 2240/128* (2013.01)

(58) Field of Classification Search
CPC ............... F01D 25/243; F05D 2220/40; F05D 2240/128; F05D 2250/314
See application file for complete search history.

(56) References Cited

U.S. PATENT DOCUMENTS

| | | | |
|---|---|---|---|
| 2015/0104296 A1 | 4/2015 | Yokoyama et al. | |
| 2016/0090858 A1* | 3/2016 | Barthelet | F01D 9/048 417/406 |
| 2016/0230565 A1 | 8/2016 | King et al. | |
| 2017/0082018 A1 | 3/2017 | Bayod et al. | |
| 2017/0198593 A1 | 7/2017 | Yoshida et al. | |
| 2017/0292381 A1 | 10/2017 | Ishii | |

FOREIGN PATENT DOCUMENTS

| | | |
|---|---|---|
| JP | H5-214949 | 8/1993 |
| JP | 2003-278556 | 10/2003 |
| JP | 2005-299660 | 10/2005 |
| JP | 2007-309140 | 11/2007 |
| JP | 2008-184971 | 8/2008 |
| JP | 2008-248867 | 10/2008 |
| JP | 2009-243375 | 10/2009 |
| JP | 2016-017408 | 2/2016 |
| WO | 2016/035329 | 3/2016 |

OTHER PUBLICATIONS

International Preliminary Report on Patentability with Written Opinion dated Oct. 14, 2021 for PCT/JP2019/041573.

* cited by examiner

VARIABLE-CAPACITY TURBOCHARGER

CROSS-REFERENCE TO RELATED APPLICATION

This application is a continuation application of PCT Application No. PCT/JP2019/041573, filed Oct. 23, 2019, which claims the benefit of priority of Japanese Patent Application No. 2019-070097, filed Apr. 1, 2019, the entire contents of which are incorporated herein by reference.

TECHNICAL FIELD

The present disclosure relates to a variable-capacity turbocharger.

BACKGROUND

A variable-capacity turbocharger is described in Japanese Unexamined Utility Model Publication No. S61-37404 in which a nozzle vane rotates while sliding on a wall surface of a nozzle flow passage of a turbine. Japanese Unexamined Utility Model Publication No. S61-37404 discloses that a wall surface of a nozzle flow passage is tapered to be spaced away from a nozzle vane at positions respectively corresponding to outer and inner peripheral portions of the nozzle vane. Further, there is proposed that the wall surface of the nozzle flow passage may be spaced away from the nozzle vane in a step shape instead of the tapered shape. In this way, the shape of the wall surface of the nozzle flow passage is intended to improve the reliability of the sliding of the nozzle vane and the smooth rotation of the nozzle vane.

SUMMARY

When the wall surface of the nozzle flow passage is formed in the step shape as described above, a flow of a gas flowing in the nozzle flow passage is likely to be separated at the step portion and may cause performance deterioration of the turbine. On the other hand, when the wall surface of the nozzle flow passage is formed in the tapered shape, it is difficult to achieve a separation of a flow of a gas as compared with the case of the step shape. Additionally, it is difficult to install a connecting pin connecting the flow passage wall surfaces to be orthogonal to the flow passage wall surfaces. That is, at the time of manufacturing the turbocharger, a part of the tapered flow passage wall surface needs to be processed to form an installation seat surface for the connecting pin. Accordingly, it cannot be said that the workability at the time of manufacturing is preferable and this may hinder a decrease in manufacturing cost.

An example variable-capacity turbocharger is disclosed herein, including a nozzle flow passage in which a gas is capable of flowing therethrough from a scroll flow passage toward a turbine impeller, a connecting pin connecting flow passage wall surfaces forming the nozzle flow passage, and nozzle vanes arranged in a rotation direction of the turbine impeller. The nozzle vanes are configured to adjust an opening degree of the nozzle flow passage by rotating in the nozzle flow passage, in which at least one of the flow passage wall surfaces includes an inner peripheral side wall surface, an outer peripheral side wall surface, and an intermediate side wall surface. The inner peripheral side wall surface extends radially inward of a first reference line extending in the rotation direction as a starting position, the inner peripheral side wall surface being inclined to extend away from the nozzle vanes in a rotation axis direction of the turbine impeller as the inner peripheral side wall surface radially inwardly goes. The outer peripheral side wall surface, which is a plane extending radially outward from a second reference line extending in the rotation direction as a starting position and parallel to a plane orthogonal to a rotation axis of the nozzle vane, is located farther from the nozzle vane than an edge portion of the inner peripheral side wall surface, the second reference line being located radially outward from the first reference line, and the edge portion being located on the first reference line. Additionally, the intermediate wall surface, which is a plane extending from the first reference line to the second reference line and parallel to the plane extending orthogonal to the rotation axis of the nozzle vane, intersects the inner peripheral side wall surface on the first reference line. The first reference line is located radially outward from an inner circumferential contact circle of the nozzle vanes at a maximum opening degree of the nozzle flow passage, and the second reference line is located radially inward of an outer circumferential contact circle of the nozzle vanes at the maximum opening degree of the nozzle flow passage. The second reference line is additionally located radially outward from an inner circumferential contact circle of the nozzle vanes at a minimum opening degree of the nozzle flow passage, and radially inward of an inner circumferential contact circle of an installation seat surface of the connecting pin.

Another example variable-capacity turbocharger is disclosed herein, including: a nozzle flow passage in which a gas is capable of flowing therethrough from a scroll flow passage toward a turbine impeller; a connecting pin connecting flow passage wall surfaces forming the nozzle flow passage; and nozzle vanes arranged in a rotation direction of the turbine impeller. The nozzle vanes are configured to adjust an opening degree of the nozzle flow passage by rotating in the nozzle flow passage, in which at least one of the flow passage wall surfaces includes an inner peripheral side wall surface and an outer peripheral side wall surface. The inner peripheral side wall surface extends radially inward of a first reference line extending in the rotation direction as a starting position, and is inclined to extend away from the nozzle vanes in a rotation axis direction of the turbine impeller as the inner peripheral side wall surface radially inwardly goes. The outer peripheral side wall surface, which is a plane extending radially outward from the first reference line extending in the rotation direction as a starting position and parallel to a plane orthogonal to a rotation axis of the nozzle vane, is located farther from the nozzle vane than an edge portion of the inner peripheral side wall surface, and the edge portion being located on the first reference line. Additionally, the first reference line is located radially inward of an outer circumferential contact circle of the nozzle vanes at the maximum opening degree of the nozzle flow passage, located radially outward from an inner circumferential contact circle of the nozzle vanes at a minimum opening degree of the nozzle flow passage, and located radially inward of an inner circumferential contact circle of an installation seat surface of the connecting pin.

DETAILED DESCRIPTION

Figure 1:
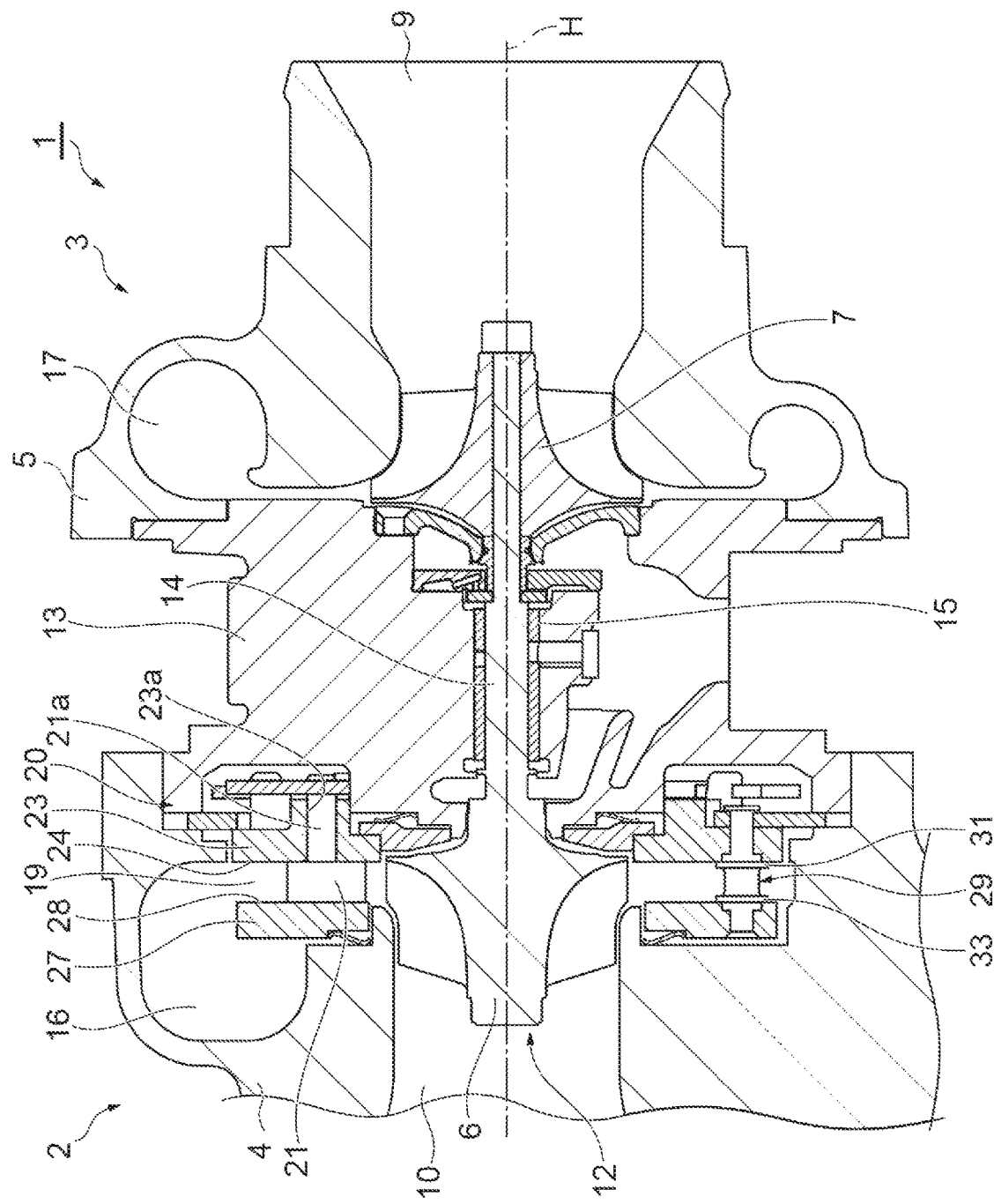
FIG. 1 is a cross-sectional view showing a rotation axis of an example variable-capacity turbocharger.

An example variable-capacity turbocharger is disclosed herein, including: a nozzle flow passage in which a gas is capable of flowing therethrough from a scroll flow passage toward a turbine impeller; a connecting pin connecting flow passage wall surfaces forming the nozzle flow passage; and nozzle vanes arranged in a rotation direction of the turbine impeller. At least one of the flow passage wall surfaces includes an inner peripheral side wall surface, an outer peripheral side wall surface, and an intermediate side wall surface. The inner peripheral side wall surface extends radially inward of a first reference line extending in the rotation direction, the inner peripheral side wall surface being inclined to extend away from the nozzle vanes in a rotation axis direction of the turbine impeller. The outer peripheral side wall surface, which extends radially outward from a second reference line extending in the rotation direction and parallel to a plane orthogonal to rotation axes of the nozzle vanes, is located farther from the nozzle vanes than an edge portion of the inner peripheral side wall surface. Additionally, the second reference line is located radially outward from the first reference line, and the edge portion is located on the first reference line. Additionally, the intermediate wall surface extending from the first reference line to the second reference line and parallel to the plane extending orthogonal to the rotation axes of the nozzle vanes, intersects the inner peripheral side wall surface on the first reference line. The first reference line is located radially outward from an inner circumferential contact circle of the nozzle vanes at a maximum opening state of the nozzle flow passage, and the second reference line is located radially inward of an outer circumferential contact circle of the nozzle vanes at the maximum opening state of the nozzle flow passage. The second reference line is additionally located radially outward from an inner circumferential contact circle of the nozzle vanes at a minimum opening state of the nozzle flow passage, and radially inward of an inner circumferential contact circle of an installation seat surface of the connecting pin.

The first reference line may be located radially inward of the rotation axes of the nozzle vanes, and the second reference line may be located radially outward from an outer circumferential contact circle of rotation shafts of the nozzle vanes.

The first reference line may be located radially inward of the inner circumferential contact circle of the nozzle vanes at the minimum opening state of the nozzle flow passage and the second reference line may be located radially outward from the outer circumferential contact circle of the nozzle vane at a minimum opening state of the nozzle flow passage.

Another example variable-capacity turbocharger is disclosed herein, including: a turbine impeller; a scroll flow passage; a nozzle flow passage connecting the scroll flow passage the turbine impeller, the nozzle flow passage including a first flow passage face and a second flow passage face; a connecting pin connecting the first flow passage face and the second flow passage face; and nozzle vanes arranged in a rotation direction of the turbine impeller. The first flow passage face includes an inner face portion and an outer face portion. Additionally, the inner face portion extends radially inward of a first reference line extending in the rotation direction, the inner face portion being inclined to extend away from the second flow passage face. The outer face portion extends radially outward from a second reference line, extends orthogonal to rotation axes of the nozzle vanes and parallel to the second flow passage face, and the second reference line extends in the rotation direction and radially outward from the first reference line. The first reference line is located radially inward of a first inner circumferential contact circle of the nozzle vanes at a first state in which the nozzle vanes are positioned at a maximum opening of the nozzle flow passage. The second reference line is located radially inward of a first outer circumferential contact circle of the nozzle vanes at the first state, is located radially outward from a second inner circumferential contact circle of the nozzle vanes at a second state in which the nozzle vanes are positioned at a minimum opening of the nozzle flow passage, and is located radially inward of a third inner circumferential contact circle of the connecting pin. Additionally, a first gap between the inner face portion and the second flow passage face is wider than a second gap between the outer face portion and the second flow passage face.

In the following description, with reference to the drawings, the same reference numbers are assigned to the same components or to similar components having the same function, and overlapping description is omitted. FIG. 1 is a cross-sectional view showing a rotation axis H of a variable-capacity turbocharger 1. The turbocharger 1 is applied to, for example, an internal combustion engine of a ship or a vehicle.

As illustrated in FIG. 1, the turbocharger 1 includes a turbine 2 and a compressor 3. The turbine 2 includes a turbine housing 4 and a turbine impeller 6 accommodated in the turbine housing 4. The turbine housing 4 includes a scroll flow passage 16 which extends in a circumferential direction around the turbine impeller 6. The compressor 3 includes a compressor housing 5 and a compressor impeller 7 accommodated in the compressor housing 5. The compressor housing 5 includes a scroll flow passage 17 which extends in the circumferential direction around the compressor impeller 7.

The turbine impeller 6 is provided at one end of a rotation shaft 14 and the compressor impeller 7 is provided at the other end of the rotation shaft 14. A bearing housing 13 is provided between the turbine housing 4 and the compressor housing 5. The turbine housing 4 and the compressor housing 5 are fastened to the bearing housing 13 by, for example, a screw or the like. The rotation shaft 14 is rotatably supported by the bearing housing 13 through a bearing 15, and the rotation shaft 14, the turbine impeller 6, and the compressor impeller 7 rotate around the rotation axis H as an integrated rotation body 12.

The turbine housing 4 is provided with an exhaust gas inlet and an exhaust gas outlet 10. An exhaust gas discharged from an internal combustion engine flows into the turbine housing 4 through the exhaust gas inlet, flows into the turbine impeller 6 through the scroll flow passage 16, and rotates the turbine impeller 6. Then, the exhaust gas flows out of the turbine housing 4 through the exhaust gas outlet 10.

The compressor housing 5 is provided with a suction port 9 and a discharge port including the exhaust gas outlet 10. When the turbine impeller 6 rotates as described above, the compressor impeller 7 rotates through the rotation shaft 14. The rotating compressor impeller 7 sucks external air through the suction port 9. This air passes through the compressor impeller 7 and the scroll flow passage 17 to be compressed and is discharged from the discharge port. The compressed air discharged from the discharge port is supplied to the internal combustion engine.

In the following description of the turbine 2 of the turbocharger 1, the "axial direction", the "radial direction", and the "circumferential direction" respectively may be understood to mean the rotation axis direction (the direction of the rotation axis H), the rotation radial direction, and the rotation direction of the turbine impeller 6.

Figure 2:
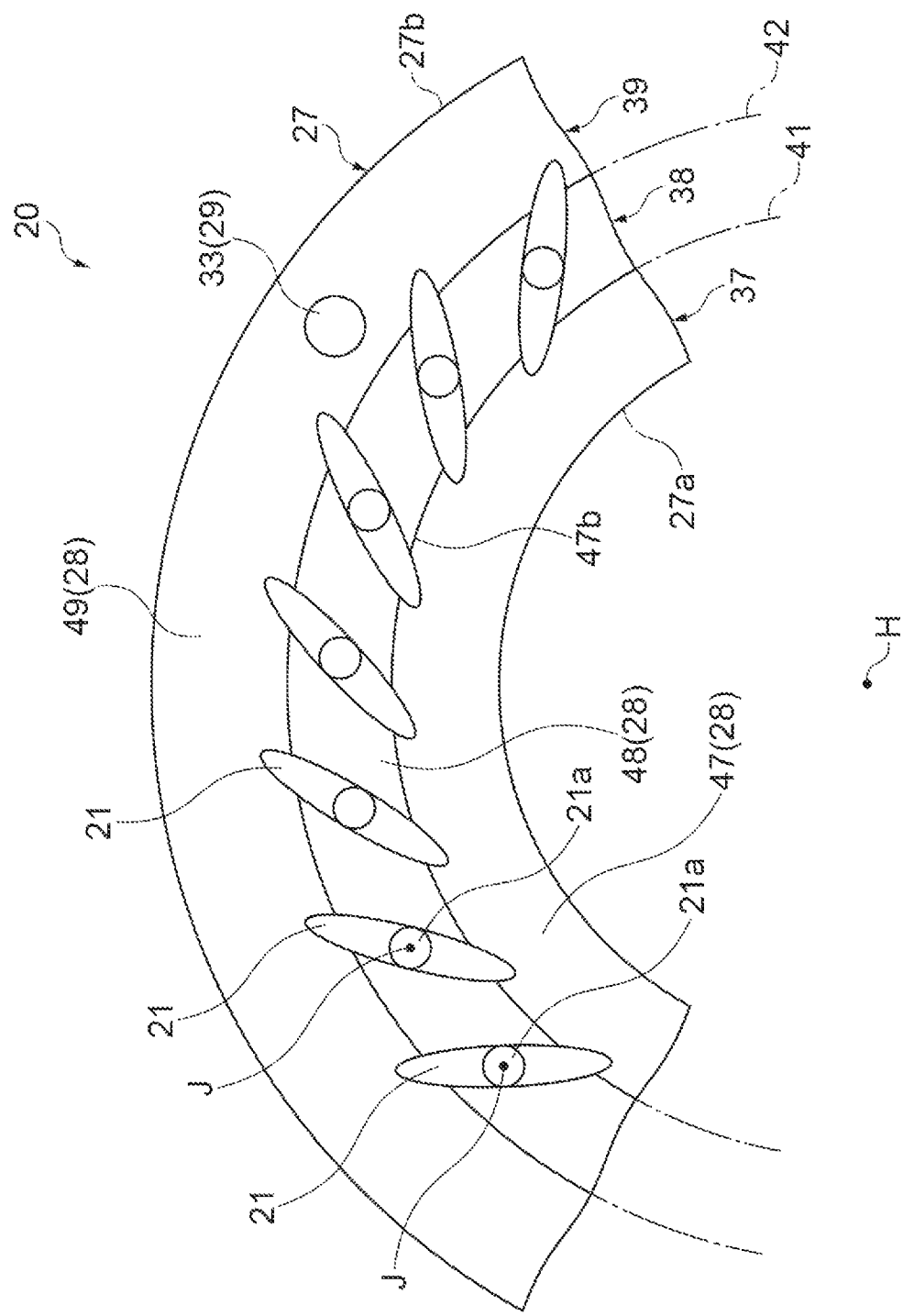
FIG. 2 illustrates example nozzle vanes and a CC plate as viewed from a suction port side of a compressor in an axial direction.

In the turbine 2 of the turbocharger 1, a rotatable nozzle vane 21 is provided in a nozzle flow passage 19 connecting the scroll flow passage 16 and the turbine impeller 6. Also as illustrated in FIG. 2, the plurality of nozzle vanes 21 are arranged at equal intervals on the circumference centered on the rotation axis H. Each of the nozzle vanes 21 rotates around a rotation axis J parallel to the rotation axis H in a synchronized manner. As the plurality of nozzle vanes 21 rotate as described above, the gap between the adjacent nozzle vanes 21 is expanded and contracted, and thereby the opening degree of the nozzle flow passage 19 is adjusted.

In order to drive the nozzle vane 21, the turbine 2 includes a variable nozzle mechanism 20. The variable nozzle mechanism 20 is fitted into the turbine housing 4 and is sandwiched and fixed between the turbine housing 4 and the bearing housing 13.

The variable nozzle mechanism 20 includes the plurality of nozzle vanes 21, a nozzle ring 23, and a clearance control plate 27 (hereinafter, referred to as a "CC plate 27"). The nozzle vane 21 is sandwiched by the nozzle ring 23 and the CC plate 27 in the axial direction. The nozzle ring 23 and the CC plate 27 each form a ring shape centered on the rotation axis H and are arranged to surround the turbine impeller 6 in the circumferential direction. The nozzle ring 23 is located on the side of the compressor 3 when viewed from the nozzle vane 21. The CC plate 27 is located on the side opposite to the compressor 3 as viewed from the nozzle vane 21.

A region sandwiched by the nozzle ring 23 and the CC plate 27 in the axial direction forms the nozzle flow passage 19. In some examples, one flow passage wall surface 24 of the nozzle flow passage 19 is formed by one surface of the nozzle ring 23. Then, the other flow passage wall surface 28 of the nozzle flow passage 19 is formed by one surface of the CC plate 27 facing the flow passage wall surface 24.

Figure 3:
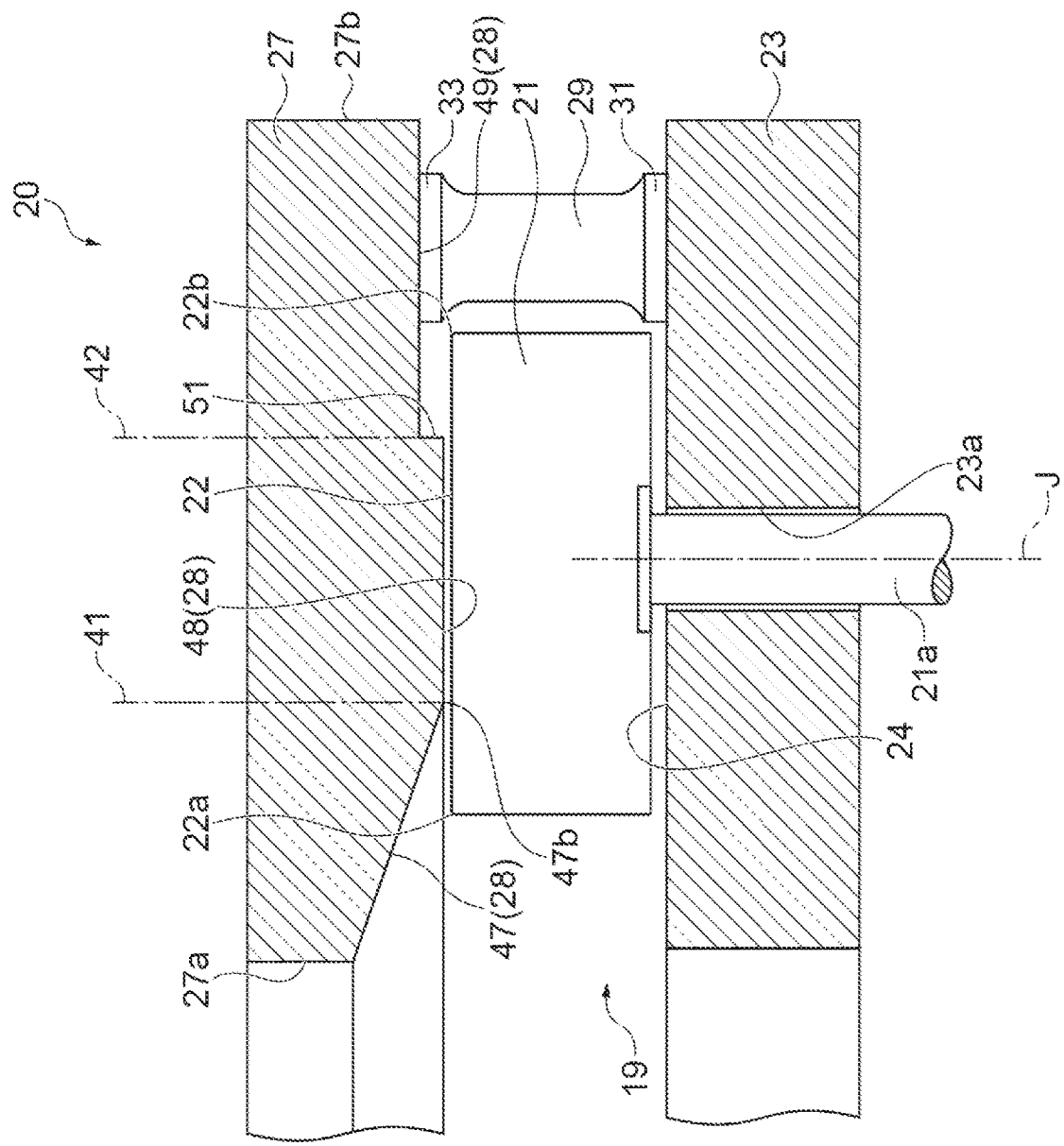
FIG. 3 is a cross-sectional view in the vicinity of an example nozzle vane showing a rotation axis of the nozzle vane.

As illustrated in FIGS. 2 and 3, the nozzle vane 21 includes a vane rotation shaft 21a which extends toward the nozzle ring 23 and a vane end surface 22 which faces the flow passage wall surface 28 of the CC plate 27. The vane end surface 22 forms a plane orthogonal to the extension direction of the vane rotation shaft 21a. As illustrated in FIG. 3, the nozzle ring 23 is provided with bearing holes 23a provided as many as the nozzle vanes 21. The vane rotation shaft 21a of each nozzle vane 21 is rotatably inserted through the bearing hole 23a and the nozzle ring 23 axially supports each nozzle vane 21 in a cantilevered manner. Each vane rotation shaft 21a penetrates the nozzle ring 23. Then, an end portion of each vane rotation shaft 21a is connected to a drive mechanism on the rear surface side of the nozzle ring 23. A driving force is transmitted from an actuator to each vane rotation shaft 21a through this drive mechanism. By the driving force, each nozzle vane 21 rotates around the rotation axis J centered on the vane rotation shaft 21a.

The nozzle ring 23 and the CC plate 27 are connected to each other by a plurality of connecting pins 29 extending in the axial direction. The connecting pin 29 is provided with two flange portions 31 and 33 orthogonal to the axis of the connecting pin 29. The flange portion 31 comes into contact with the flow passage wall surface 24 and the flange portion 33 comes into contact with the flow passage wall surface 28 so that the nozzle ring 23 and the CC plate 27 are respectively positioned. The dimensional accuracy of the nozzle flow passage 19 in the axial direction is ensured by manufacturing the dimensions between the flange portions 31 and 33 with high accuracy. The connecting pin 29 is installed at a position where the connection pin does not interfere with the rotation of the nozzle vane 21.

The flow passage wall surface 28 of the CC plate 27 is divided into three regions in the radial direction with a first reference line 41 and a second reference line 42 as boundary lines. Both the first reference line 41 and the second reference line 42 form a circle centered on the rotation axis H. Then, the second reference line 42 is located radially outward from the first reference line 41.

The three regions are referred to as an inner peripheral region 37, an intermediate region 38, and an outer peripheral region 39 in order from the inner peripheral side. The inner peripheral region 37 is an annular region from the first reference line 41 to an inner peripheral edge 27a of the CC plate 27. The intermediate region 38 is an annular region from the first reference line 41 to the second reference line 42. The outer peripheral region 39 is an annular region from the second reference line 42 to an outer peripheral edge 27b of the CC plate 27. In the flow passage wall surface 28, a portion of the inner peripheral region 37 is referred to as an inner peripheral side wall surface 47, a portion of the intermediate region 38 is referred to as an intermediate wall surface 48, and a portion of the outer peripheral region 39 is referred to as an outer peripheral side wall surface 49. Additionally, the inner peripheral side wall surface 47, the intermediate wall surface 48, and the outer peripheral side wall surface 49 may also or alternatively be referred to herein by the equivalent terms of an inner face portion, an intermediate face portion, and an outer face portion, respectively.

The inner peripheral side wall surface 47 extends inward of the first reference line 41 as a starting position. Then, the inner peripheral side wall surface 47 is an inclined surface which is inclined to be spaced away from the vane end surface 22 of the nozzle vane 21 in the axial direction as it goes inward in the radial direction. In a cross-section illustrated in FIG. 3, the inner peripheral side wall surface 47 forms a straight line.

The outer peripheral side wall surface 49 extends radially outward from the second reference line 42 as a starting position. Then, the outer peripheral side wall surface 49 is a plane which is parallel to the plane orthogonal to the rotation axis J of the nozzle vane 21. The outer peripheral side wall surface 49 is located to be spaced away from the vane end surface 22 in the axial direction in relation to an edge portion 47b on the first reference line 41 of the inner peripheral side wall surface 47.

The intermediate wall surface 48 is a plane which is parallel to a plane orthogonal to the rotation axis J and intersects the inner peripheral side wall surface 47 on the first reference line 41. The intermediate wall surface 48 is located to be spaced away from the vane end surface 22 in the axial direction by the same distance in relation to the edge portion 47b of the inner peripheral side wall surface 47 on the first reference line 41. Compared to the intermediate wall surface 48, the outer peripheral side wall surface 49 is spaced away from the vane end surface 22 in the axial direction. Accordingly, a step portion 51 between the outer peripheral side wall surface 49 and the intermediate wall surface 48 exists on the second reference line 42.

Figure 4:
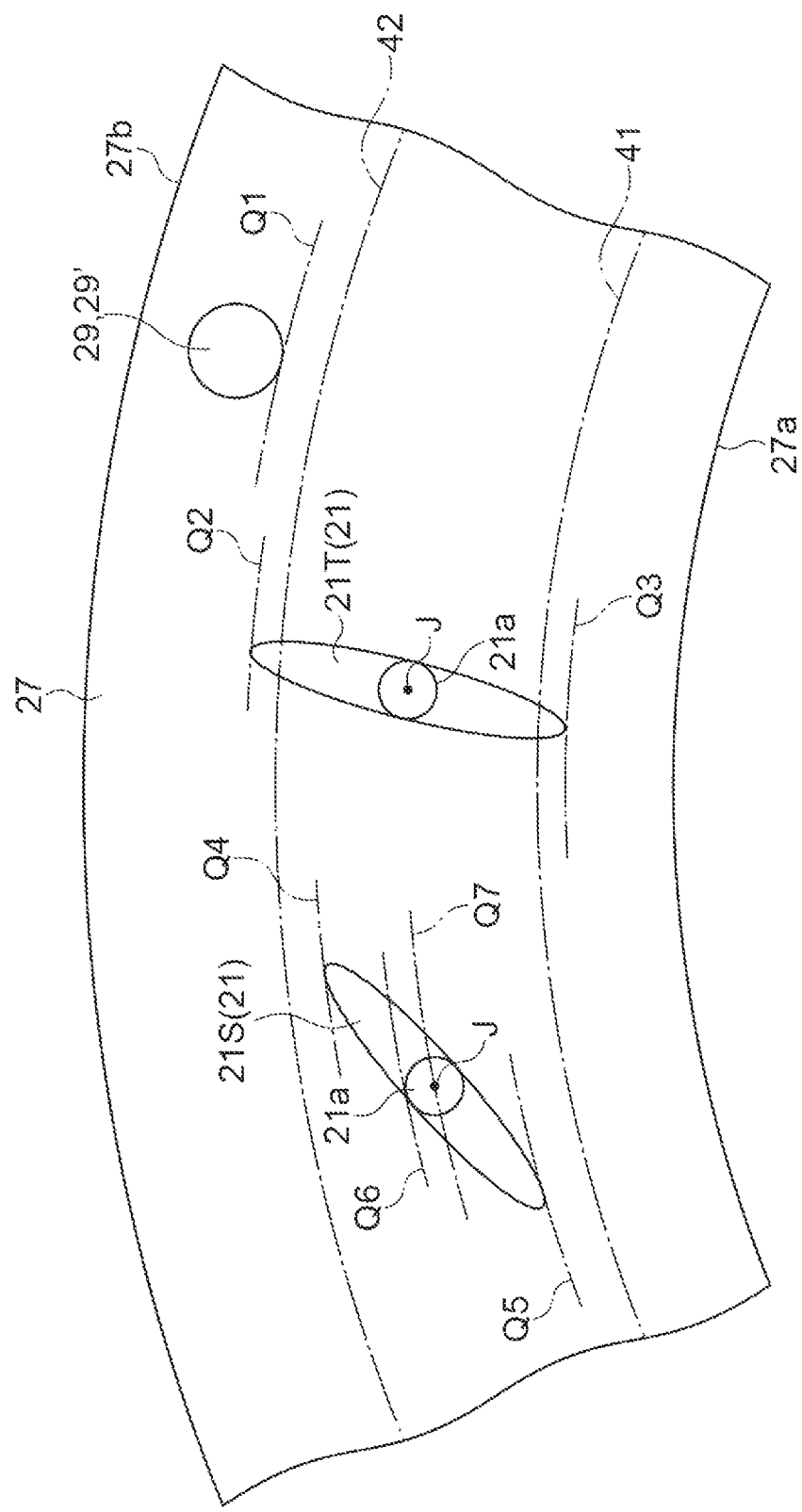
FIG. 4 is a schematic illustration of a positional relationship of nozzle vanes, a connecting pin, and the CC plate.

Referring to FIG. 4, the radial positions of the first reference line 41 and the second reference line 42 will be described. FIG. 4 is a view schematically illustrating a positional relationship of the nozzle vanes 21, the connecting pin 29, and the CC plate 27. The first reference line 41 and the second reference line 42 illustrated in FIG. 4 are illustrative examples, and the radial positions of the first reference line 41 and the second reference line 42 may vary in other examples.

A nozzle vane 21S in FIG. 4 shows the nozzle vane 21 when the nozzle flow passage 19 has a minimum opening degree. A nozzle vane 21T in FIG. 4 shows the nozzle vane 21 when the nozzle flow passage 19 has a maximum opening degree. When the nozzle flow passage 19 has a minimum opening degree, an angle formed by the longitudinal direction of the nozzle vane 21 with respect to the circumferential direction is the smallest and the minimum gap (nozzle throat) between the adjacent nozzle vanes 21 is the narrowest. When the nozzle flow passage 19 has a maximum opening degree, an angle formed by the longitudinal direction of the nozzle vane 21 with respect to the circumferential direction is the largest and the minimum gap (nozzle throat) between the adjacent nozzle vanes 21 is the widest. Reference Numeral 29' in FIG. 4 indicates the installation seat surface of the connecting pin 29 which is installed on the innermost side in the radial direction among the plurality of connecting pins 29. The flange portion 33 of the connecting pin 29 comes into contact with this installation seat surface 29'.

A line Q1 in FIG. 4 indicates an inner circumferential contact circle of the installation seat surface 29'. That is, the line Q1 indicates an inscribed circle centered on the rotation axis H and inscribed in the installation seat surface 29'.

A line Q2 in FIG. 4 indicates an outer circumferential contact circle of the nozzle vane 21T. In some examples, the line Q2 indicates a circumscribed circle circumscribing all nozzle vanes 21T.

A line Q3 in FIG. 4 indicates an inner circumferential contact circle of the nozzle vane 21T. In some examples, the line Q3 indicates an inscribed circle inscribed in all nozzle vanes 21T.

A line Q4 in FIG. 4 indicates an outer circumferential contact circle of the nozzle vane 21S. In some examples, the line Q4 indicates a circumscribed circle circumscribing all nozzle vanes 21S.

A line Q5 in FIG. 4 indicates an inner circumferential contact circle of the nozzle vane 21S. In some examples, the line Q5 indicates an inscribed circle inscribed in all nozzle vanes 21S.

A line Q6 in FIG. 4 indicates an outer circumferential contact circle of the vane rotation shaft 21a. In some examples, the line Q6 indicates a circumscribed circle circumscribing all vane rotation shafts 21a.

A line Q7 in FIG. 4 indicates a circle passing through the rotation axes J of all nozzle vanes 21.

The line Q1 is located radially outward from the line Q2 in the example of FIG. 4, but the line Q1 may be located inside the line Q2 in the radial direction in other examples. The lines Q1 to Q7 are concentric circles centered on the rotation axis H. Further, all the lines Q1 to Q7 extend in a plane orthogonal to the rotation axis H.

In some examples, the radial positions of the first reference line 41 and the second reference line 42 are set so that all of the following conditions C1 to C4 below are satisfied.

Condition C1: the first reference line 41 is located radially outward from the line Q3.

Condition C2: the second reference line 42 is located radially inward of the line Q2.

Condition C3: the second reference line 42 is located radially outward from the line Q5.

Condition C4: the second reference line 42 is located radially inward of the line Q1.

If the condition C1 is satisfied, when the nozzle flow passage 19 has a maximum opening degree, an end portion 22a radially inward of the vane end surface 22 is located at a position facing the inner peripheral side wall surface 47 as illustrated in FIG. 3. Then, even when the vane end surface 22 comes into contact with the intermediate wall surface 48, an axial gap is formed between the end portion 22a and the inner peripheral side wall surface 47 since the inner peripheral side wall surface 47 is an inclined surface.

Similarly, if the condition C2 is satisfied, when the nozzle flow passage 19 has a maximum opening degree, a radial outer end portion 22b of the vane end surface 22 is located at a position facing the outer peripheral side wall surface 49 as illustrated in FIG. 3. Then, since the outer peripheral side wall surface 49 is located to be spaced away from the vane end surface 22 in the axial direction in relation to the edge portion 47b, a gap is formed between the end portion 22b and the outer peripheral side wall surface 49 in the axial direction even when the vane end surface 22 comes into contact with the intermediate wall surface 48.

As described above, if the conditions C1 and C2 are satisfied, when the nozzle flow passage 19 has a maximum opening degree, a slight gap is formed between the end portions 22a and 22b of the vane end surface 22 and the flow passage wall surface 28 in the axial direction. Accordingly, the friction between the end portions 22a and 22b of the vane end surface 22, and the flow passage wall surface 28 can be reduced in order to maintain the unhindered rotation and smooth operation of the nozzle vane 21.

If the condition C3 is not satisfied, when the nozzle flow passage 19 has a minimum opening degree, the end portion 22a of the vane end surface 22 is located outward from the step portion 51. Therefore, the end portion 22a of the vane end surface 22 is caught by the step portion 51. On the other hand, if the condition C3 is satisfied, the smooth rotation function of the nozzle vane 21 may be maintained.

If the condition C4 is satisfied, the flange portion 33 of the connecting pin 29 is installed on the outer peripheral side wall surface 49. If the outer peripheral side wall surface 49 is an inclined surface similar to the inner peripheral side wall surface 47 the installation seat surface of the connecting pin 29 is formed by counterbore processing for the outer peripheral side wall surface 49 in order to install the flange portion 33 orthogonal to the axis of the connecting pin 29. On the other hand, since the outer peripheral side wall surface 49 is parallel to the plane orthogonal to the rotation axis J, the flange portion 33 may be installed on the outer peripheral side wall surface 49 without performing the above-described processing. Accordingly, the number of manufacturing steps for the turbocharger 1 and thus the manufacturing cost may both be reduced.

The inner peripheral side wall surface 47 and the intermediate wall surface 48 are connected to each other on the first reference line 41 without a step. Accordingly, the possibility of the separation of the gas flow from the intermediate wall surface 48 to the inner peripheral side wall surface 47 is reduced compared to a case where a step exists between the inner peripheral side wall surface 47 and the intermediate wall surface 48. On the other hand, since the step portion 51 exists between the outer peripheral side wall surface 49 and the intermediate wall surface 48, the possibility of the separation of the gas flow is relatively high. However, since the outer peripheral side wall surface 49 is on the upstream side of the gas in relation to the inner peripheral side wall surface 47 and the flow velocity of the gas is slow, the performance deterioration of the turbine 2 is relatively small even if the separation occurs.

As described above, the example turbocharger 1 may be configured to provide a smooth rotation of the nozzle vane 21 in order to maintain or improve the performance of the turbine 2 and reduce the amount of manufacturing work at the same time.

Figure 5A:
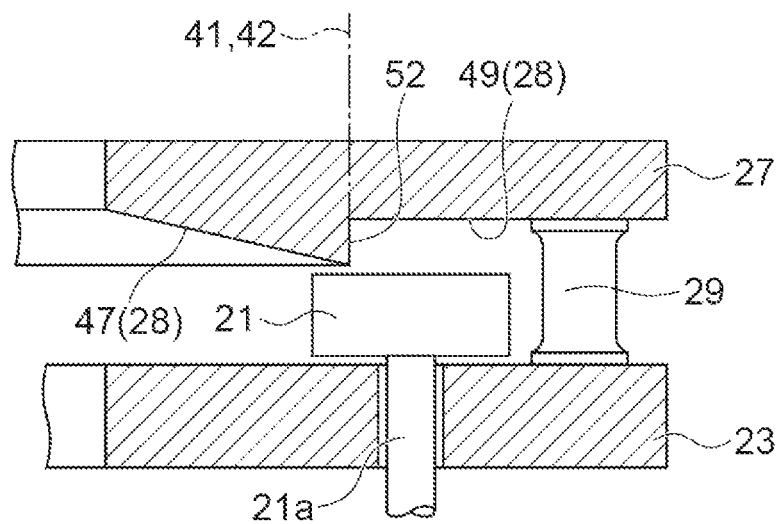
FIGS. 5A to 5C are cross-sectional views in the vicinity of another example nozzle vane.
Figure 5B:
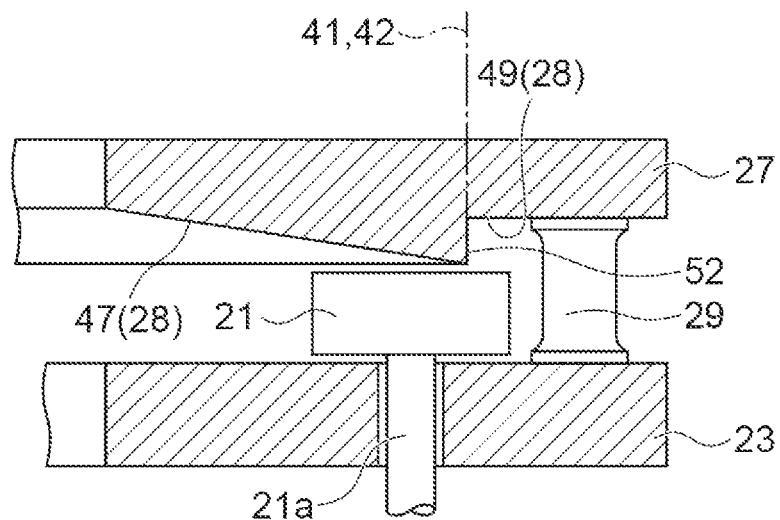
Figure 5C:
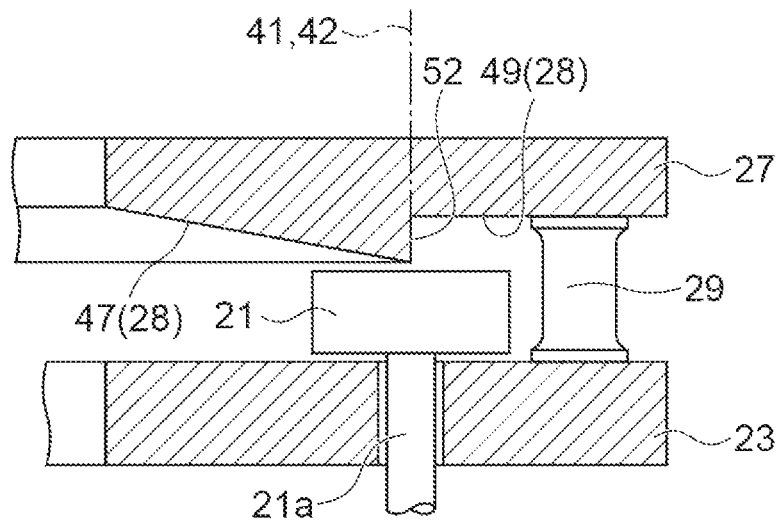

By way of further example, as illustrated in FIGS. 5A to 5C, the first reference line 41 and the second reference line 42 may coincide with each other, and the intermediate region 38 and the intermediate wall surface 48 may be configured differently than as described above. In FIGS. 5A to 5C, all the conditions C1 to C4 are satisfied. If the conditions C1 to C4 are arranged under the condition that the first reference line 41 and the second reference line 42 coincide with each other, the coincided first and second reference lines 41 and 42 are located radially inward of the line Q2, located radially outward from the line Q5, and located radially inward of the line Q1.

FIG. 5A illustrates an example in which the first reference line 41 and the second reference line 42 coincide with each other at a position radially inward of the vane rotation shaft 21a. In this case, the intermediate region 38 and the intermediate wall surface 48 do not exist and a step portion 52 exists between the inner peripheral side wall surface 47 and the outer peripheral side wall surface 49. As illustrated in FIG. 5B, the first reference line 41 and the second reference line 42 may coincide with each other at a position radially outward from the vane rotation shaft 21a. Further, as illustrated in FIG. 5C, the first reference line 41 and the second reference line 42 may coincide with each other at a position on the vane rotation shaft 21a.

In the turbocharger 1, the following conditions C5 and C6 may be further satisfied.

Condition C5: the first reference line 41 is located radially inward of the line Q7.

Condition C6: the second reference line 42 is located radially outward from the line Q6.

If the conditions C5 and C6 are satisfied, a part of a portion in the vane end surface 22, which corresponds to at least the vane rotation shaft 21a, faces the intermediate wall surface 48. Since a gap between the vane end surface 22 and the flow passage wall surface 28 in a portion facing the intermediate wall surface 48 is small and a gas leaking from the gap is reduced, the performance of the turbine 2 may be maintained.

In an example procedure for assembling the variable nozzle mechanism 20, the vane rotation shaft 21a of each nozzle vane 21 is inserted into each bearing hole 23a of the nozzle ring 23, and the nozzle ring 23 and the CC plate 27 are connected to each other by the connecting pin 29. Then, one component of the drive mechanism is crimped to the end portion of each vane rotation shaft 21a on the rear surface side of the nozzle ring 23. At this time, if the conditions C5 and C6 are satisfied, a part of a portion in the vane end surface 22, which corresponds to at least the vane rotation shaft 21a, faces the intermediate wall surface 48. Therefore, the caulking process can be performed with the nozzle vane 21 stabilized by bringing the portion into contact with the intermediate wall surface 48, and the workability is improved. In this way, when the above-described assembly procedure of the variable nozzle mechanism 20 is adopted, the workability can be improved by satisfying the conditions C5 and C6.

In the turbocharger 1, the following conditions C7 and C8 may be further satisfied.

Condition C7: the first reference line 41 is located radially inward of the line Q5.

Condition C8: the second reference line 42 is located radially outward from the line Q4.

If the conditions C7 and C8 are satisfied, the entire vane end surface 22 faces the intermediate wall surface 48 when the nozzle flow passage 19 has a minimum opening degree. Therefore, a gap between the nozzle vane 21 and the flow passage wall surface 28 is small and a gas leaking from the gap can be reduced. As a result, the performance of the turbine 2 is maintained at the minimum opening degree of the nozzle flow passage 19. Since the flow velocity of the gas is fast when the nozzle flow passage 19 has a minimum opening degree, the influence of a gas leaking from the gap between the nozzle vane 21 and the flow passage wall surface 28 on the performance of the turbine 2 is large. Accordingly, it is particularly effective to decrease the gap between the nozzle vane 21 and the flow passage wall surface 28 when the nozzle flow passage 19 has a minimum opening degree.

As illustrated in FIG. 4, when all of the conditions C1 to C8 are satisfied, the first reference line 41 is located between the line Q3 and the line Q5 and the second reference line 42 is located between the line Q4 and the one of the line Q1 and the line Q2 which is located radially inward of the other.

It is to be understood that not all aspects, advantages and features described herein may necessarily be achieved by, or included in, any one particular example. Indeed, having described and illustrated various examples herein, it should be apparent that other examples may be modified in arrangement and detail.

For example, although the nozzle vane 21 is described as being supported by the nozzle ring 23 in a cantilevered manner, in other examples the nozzle vane is supported by the nozzle ring 23 and the CC plate 27 on both sides.

Additionally, whereas the inner peripheral side wall surface 47, the intermediate wall surface 48, and the outer peripheral side wall surface 49 are described as being formed in the flow passage wall surface 28, in other examples the inner peripheral side wall surface 47, the intermediate wall surface 48, and the outer peripheral side wall surface 49 may be formed on the flow passage wall surface 24. Further, the inner peripheral side wall surface 47, the intermediate wall surface 48, and the outer peripheral side wall surface 49 may be formed on both the flow passage wall surface 24 and the flow passage wall surface 28.

In some examples, the nozzle vane 21 is may be pressed toward the flow passage wall surface 28 due to the pressure balance between the nozzle flow passage 19 and the rear surface side of the nozzle ring 23. In the case of such a pressure balance, since the vane end surface 22 is pressed toward the flow passage wall surface 28, the friction between the vane end surface 22 and the flow passage wall surface 28 tends to be a problem. For this reason, in the case of the above-described pressure balance, the inner peripheral side wall surface 47, the intermediate wall surface 48, and the outer peripheral side wall surface 49 preferably exist on the flow passage wall surface 28. On the other hand, in the case of the pressure balance in which the nozzle vane 21 is pressed toward the flow passage wall surface 24, the inner peripheral side wall surface 47, the intermediate wall surface 48, and the outer peripheral side wall surface 49 preferably exist on the flow passage wall surface 24 due to the same reason.

In some examples, the nozzle vanes 21 are arranged at equal intervals (equal pitches) in the circumferential direction, however the nozzle vanes 21 may also be arranged at unequal pitches. Further, the connecting pin 29 may include the flange portions 31 and 33, but the flange portion may be omitted. In this case, the connecting pin 29 includes a large-diameter columnar portion extending between the flow passage wall surfaces 24 and 28 in the axial direction, and small-diameter columnar portions respectively extending from both end surfaces of the large-diameter columnar portion in the axial direction. Then, the small-diameter columnar portions are respectively inserted into the nozzle ring 23 and the CC plate 27. Then, a circumferential edge portion of an end surface of the large-diameter columnar portion of the connecting pin 29 comes into contact with the installation seat surface 29' of the flow passage wall surface 28.

The invention claimed is:

1. A variable-capacity turbocharger comprising:
a nozzle flow passage in which a gas is capable of flowing therethrough from a scroll flow passage toward a turbine impeller;
a connecting pin connecting flow passage wall surfaces forming the nozzle flow passage; and
nozzle vanes arranged in a rotation direction of the turbine impeller,
wherein at least one of the flow passage wall surfaces includes:
an inner peripheral side wall surface extending radially inward of a first reference line extending in the rotation direction, the inner peripheral side wall surface being inclined to extend away from the nozzle vanes in a rotation axis direction of the turbine impeller;
an outer peripheral side wall surface extending radially outward from a second reference line extending in the rotation direction and parallel to a plane orthogonal to rotation axes of the nozzle vanes, the outer peripheral side wall surface being located farther from the nozzle vanes than an edge portion of the inner peripheral side wall surface, the second reference line being located radially outward from the first reference line, and the edge portion being located on the first reference line; and
an intermediate wall surface extending from the first reference line to the second reference line and parallel to the plane extending orthogonal to the rotation axes of the nozzle vanes, the intermediate wall surface intersecting the inner peripheral side wall surface on the first reference line,
wherein the first reference line is located radially outward from an inner circumferential contact circle of the nozzle vanes at a maximum opening state of the nozzle flow passage,
wherein the second reference line is located radially inward of an outer circumferential contact circle of the nozzle vanes at the maximum opening state of the nozzle flow passage,
wherein the second reference line is located radially outward from an inner circumferential contact circle of the nozzle vanes at a minimum opening state of the nozzle flow passage, and
wherein the second reference line is located radially inward of an inner circumferential contact circle of an installation seat surface of the connecting pin.

2. The variable-capacity turbocharger according to claim 1,
wherein a step portion between the outer peripheral side wall surface and the intermediate wall surface is located on the second reference line.

3. The variable-capacity turbocharger according to claim 1,
wherein the intermediate wall surface is located closer to the nozzle vanes than the outer peripheral side wall surface in the rotation axis direction.

4. The variable-capacity turbocharger according to claim 1,
wherein the first reference line is located radially inward of the rotation axes of the nozzle vanes, and
wherein the second reference line is located radially outward from an outer circumferential contact circle of rotation shafts of the nozzle vanes.

5. The variable-capacity turbocharger according to claim 2,
wherein the first reference line is located radially inward of the inner circumferential contact circle of the nozzle vanes at the minimum opening state of the nozzle flow passage, and
wherein the second reference line is located radially outward from an outer circumferential contact circle of the nozzle vanes at the minimum opening state of the nozzle flow passage.

6. The variable-capacity turbocharger according to claim 1,
wherein the connecting pin includes a first flange including the installation seat surface and extending arranged parallel to the outer peripheral side wall surface.

7. The variable-capacity turbocharger according to claim 4,
wherein the installation seat surface is in contact with the outer peripheral side wall surface.

8. A variable-capacity turbocharger comprising:
a turbine impeller;
a scroll flow passage;
a nozzle flow passage connecting the scroll flow passage and the turbine impeller, the nozzle flow passage including a first flow passage face and a second flow passage face;
a connecting pin connecting the first flow passage face and the second flow passage face; and
nozzle vanes arranged in a rotation direction of the turbine impeller,
wherein the first flow passage face includes:
an inner face portion extending radially inward of a first reference line extending in the rotation direction, the inner face portion being inclined to extend away from the second flow passage face; and
an outer face portion extending radially outward from a second reference line, the outer face portion extending orthogonal to rotation axes of the nozzle vanes and parallel to the second flow passage face, and the second reference line extending in the rotation direction and radially outward from the first reference line,
wherein the first reference line is located radially inward of a first inner circumferential contact circle of the nozzle vanes at a first state in which the nozzle vanes are positioned at a maximum opening of the nozzle flow passage, wherein the second reference line is located radially inward of a first outer circumferential contact circle of the nozzle vanes at the first state, is located radially outward from a second inner circumferential contact circle of the nozzle vanes at a second state in which the nozzle vanes are positioned at a minimum opening of the nozzle flow passage, and is located radially inward of a third inner circumferential contact circle of the connecting pin, and wherein a first gap between the inner face portion and the second flow passage face is wider than a second gap between the outer face portion and the second flow passage face.

9. The variable-capacity turbocharger according to claim 8,
wherein a step portion between the inner face portion and the outer face portion is located on the second reference line.

10. The variable-capacity turbocharger according to claim 8,
wherein the first flow passage face further includes an intermediate face portion interposed between the inner face portion and the outer face portion, and
wherein the intermediate face portion is located closer to the nozzle vanes than the outer face portion in a rotation axis direction of the nozzle vanes.

11. The variable-capacity turbocharger according to claim 8,
wherein the first reference line is located radially inward of the rotation axes of the nozzle vanes, and
wherein the second reference line is located radially outward from a second outer circumferential contact circle of rotation shafts of the nozzle vanes.

12. The variable-capacity turbocharger according to claim 9,
wherein the first reference line is located radially inward of the second inner circumferential contact circle, and
wherein the second reference line is located radially outward from a third outer circumferential contact circle of the nozzle vanes at the second state.

13. The variable-capacity turbocharger according to claim 8,
wherein the connecting pin includes a first flange extending arranged parallel to the outer face portion.

14. The variable-capacity turbocharger according to claim 11,
wherein the first flange is in contact with the outer face portion.

15. A variable-capacity turbocharger comprising:
a turbine impeller;
a scroll flow passage;
a nozzle flow passage connecting a scroll flow passage and a turbine impeller, the nozzle flow passage including a first flow passage face and a second flow passage face;
a connecting pin connecting the first flow passage face and the second flow passage face; and
nozzle vanes arranged in a rotation direction of the turbine impeller,
wherein the first flow passage face includes:
an inner face portion extending radially inward of a reference line extending in the rotation direction, the inner face portion being inclined to extend away from the second flow passage face; and
an outer face portion extending radially outward from the reference line, the outer face portion extending orthogonal to rotation axes of the nozzle vanes and parallel to the second flow passage face,
wherein the reference line is located radially inward of an outer circumferential contact circle of the nozzle vanes at a first state in which the nozzle vanes are positioned at a maximum opening of the nozzle flow passage, is located radially outward from an inner circumferential contact circle of the nozzle vanes at a second state in which the nozzle vanes are positioned at a minimum opening of the nozzle flow passage, and is located radially inward of an inner circumferential contact circle of the connecting pin,
wherein a first gap between the inner face portion and the second flow passage face is wider than a second gap between the outer face portion and the second flow passage face.

16. The variable-capacity turbocharger according to claim 15,
wherein the reference line is located radially inward of the rotation axes of the nozzle vanes.

17. The variable-capacity turbocharger according to claim 15,
wherein the reference line is located radially outward from the rotation axes of the nozzle vanes.

18. The variable-capacity turbocharger according to claim 15,
wherein a step portion between the inner face portion and the outer face portion is located on the reference line.

19. The variable-capacity turbocharger according to claim 15,
wherein the connecting pin includes a first flange extending arranged parallel to the outer face portion.

20. The variable-capacity turbocharger according to claim 18,
wherein the first flange is in contact with the outer face portion.

* * * * *